United States Patent
Generale et al.

(10) Patent No.: US 11,242,758 B2
(45) Date of Patent: Feb. 8, 2022

(54) TRAILING EDGE INSERT FOR AIRFOIL VANE

(71) Applicant: RAYTHEON TECHNOLOGIES CORPORATION, Farmington, CT (US)

(72) Inventors: Adam P. Generale, Dobbs Ferry, NY (US); Dominic J. Mongillo, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/679,229

(22) Filed: Nov. 10, 2019

(65) Prior Publication Data

US 2021/0140322 A1 May 13, 2021

(51) Int. Cl.
*F01D 5/18* (2006.01)
*F01D 25/12* (2006.01)

(52) U.S. Cl.
CPC .............. *F01D 5/187* (2013.01); *F01D 25/12* (2013.01); *F05D 2220/32* (2013.01); *F05D 2230/60* (2013.01)

(58) Field of Classification Search
CPC .......... F01D 5/189; F01D 25/12; F01D 5/188; F01D 5/18; F01D 17/162; F01D 25/08; F01D 5/183
See application file for complete search history.

(56) References Cited

U.S. PATENT DOCUMENTS

| | | | |
|---|---|---|---|
| 4,153,386 A | 5/1979 | Leogrande et al. | |
| 4,437,810 A | 3/1984 | Pearce | |
| 5,328,331 A | 7/1994 | Bunker et al. | |
| 5,515,260 A * | 5/1996 | Watanabe | G05F 3/242 |
| | | | 323/280 |
| 6,162,347 A * | 12/2000 | Fleck | F01D 5/147 |
| | | | 205/662 |
| 9,988,913 B2 | 6/2018 | Spangler | |

(Continued)

FOREIGN PATENT DOCUMENTS

| | | |
|---|---|---|
| EP | 0541207 | 5/1993 |
| EP | 1233146 | 8/2002 |
| EP | 3124747 | 2/2017 |

OTHER PUBLICATIONS

The Extended European Search Report for European Patent Application No. 20206364.0, dated Mar. 11, 2021.

*Primary Examiner* — Long T Tran
(74) *Attorney, Agent, or Firm* — Carlson, Gaskey & Olds, P.C.

(57) ABSTRACT

An example airfoil vane according to the present disclosure includes an airfoil section including an outer wall that defines an internal cavity, and an insert situated in the internal cavity. A space is defined between the insert and the airfoil outer wall, the insert including an insert wall. A plurality of standoff features extend from the insert wall into the space and contact the airfoil outer wall at a contact area, whereby the standoff features are configured to block airflow in the space at the contact area and redirect the airflow to gaps between the standoff features. A gas turbine engine with the example airfoil vane and a method of assembling an airfoil vane are also disclosed.

20 Claims, 4 Drawing Sheets

(56) References Cited

U.S. PATENT DOCUMENTS

| | | | |
|---|---|---|---|
| 2016/0090846 A1* | 3/2016 | Riley | F01D 9/041 |
| | | | 415/115 |
| 2017/0030202 A1 | 2/2017 | Itzel et al. | |
| 2017/0145833 A1* | 5/2017 | Thornton | F01D 25/12 |
| 2017/0204734 A1* | 7/2017 | Groves, II | F01D 9/065 |
| 2017/0234139 A1* | 8/2017 | Bunker | F23R 3/002 |
| | | | 60/752 |
| 2018/0320530 A1* | 11/2018 | Feldmann | F01D 5/20 |
| 2018/0328187 A1* | 11/2018 | Oke | F01D 9/065 |
| 2018/0328188 A1* | 11/2018 | Marinelli | F01D 5/186 |
| 2018/0347466 A1* | 12/2018 | Correia | F01D 9/065 |

\* cited by examiner

TRAILING EDGE INSERT FOR AIRFOIL VANE

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Any of the fan section, the turbine section, and the compressor section include airfoils, such as for fan, compressor, or turbine blades/vanes. Baffles or inserts are known and used in cooled gas turbine engine airfoils, such as turbine vanes. Typically, an insert is situated in a cavity in the airfoil and serves to distribute cooling air to precise locations in the airfoil.

SUMMARY

An example airfoil vane according to the present disclosure includes an airfoil section including an outer wall that defines an internal cavity, and an insert situated in the internal cavity. A space is defined between the insert and the airfoil outer wall, the insert including an insert wall. A plurality of standoff features extend from the insert wall into the space and contact the airfoil outer wall at a contact area, whereby the standoff features are configured to block airflow in the space at the contact area and redirect the airflow to gaps between the standoff features.

In a further example of the foregoing, the plurality of standoff features includes a radial column of standoff features.

In a further example of any of the foregoing, the radial column of standoff features extends an entire radial extent of the insert.

In a further example of any of the foregoing, the radial column of standoff features extends less than an entire radial extent of the insert.

In a further example of any of the foregoing, the airfoil section includes at least one divider dividing the internal cavity into two or more sections.

In a further example of any of the foregoing, the insert is situated in a section or the two or more sections that is nearest a trailing edge of the airfoil section.

In a further example of any of the foregoing, the plurality of standoff features are stamped into the insert wall.

In a further example of any of the foregoing, at least some of the plurality of standoff features have a cross-sectional shape that is generally round.

In a further example of any of the foregoing, the plurality of standoff features are attached to an outer surface of the insert wall.

In a further example of any of the foregoing, wherein at least some of the plurality of standoff features are oblong, and have a dimension in the radial direction that is greater than a dimension in the axial direction.

In a further example of any of the foregoing, the plurality of standoff features are arranged closer to a trailing edge of the insert than a leading edge of the insert.

In a further example of any of the foregoing, at least one slot extending through the insert downstream from the plurality of standoff features, the at least one slot configured to communicate cooling air from an internal cavity of the insert to the space.

In a further example of any of the foregoing, the plurality of standoff features provide a cumulative blocked area that is between about 10 and 70 percent.

An example gas turbine engine according to the present disclosure includes a compressor section, a combustor in fluid communication with the compressor section, and a turbine section in fluid communication with the combustor. An airfoil vane is in at least one of the compressor section and the turbine section, the airfoil vane including an outer platform and an inner platform, with an airfoil section therebetween. The airfoil section has an outer wall that defines an internal cavity. An insert is situated in the internal cavity. A space is defined between the insert and the airfoil outer wall. The space is configured to receive cooling air. The insert includes an insert wall with a plurality of standoff features extending from the insert wall into the space, and contacting the airfoil outer wall at a contact area, whereby the plurality of standoff features are configured to block flow of the cooling air in the space at the contact area.

In a further example of any of the foregoing, at least one slot extending through the insert downstream from the plurality of standoff features, the at least one slot configured to communicate the cooling air from an internal cavity of the insert to the space.

In a further example of any of the foregoing, the cooling air flows between adjacent ones of the plurality of standoff features.

In a further example of any of the foregoing, the plurality of standoff features are configured to disrupt cooling air flow in the space.

In a further example of any of the foregoing, the cooling air is bleed air from the compressor section.

An example method of assembling a ceramic matrix composite airfoil vane includes inserting an insert into a central cavity of a ceramic matrix composite airfoil such that there is a space defined between the insert and an airfoil outer wall, the insert including an insert wall, and plurality of standoff features extending form the insert wall into the space, and contacting the airfoil outer wall at a contact area, whereby the standoff features are configured to block flow of cooling air in the space at the contact area.

In a further example of any of the foregoing, the plurality of standoff features includes a radial column of standoff features.

DETAILED DESCRIPTION

Figure 1:
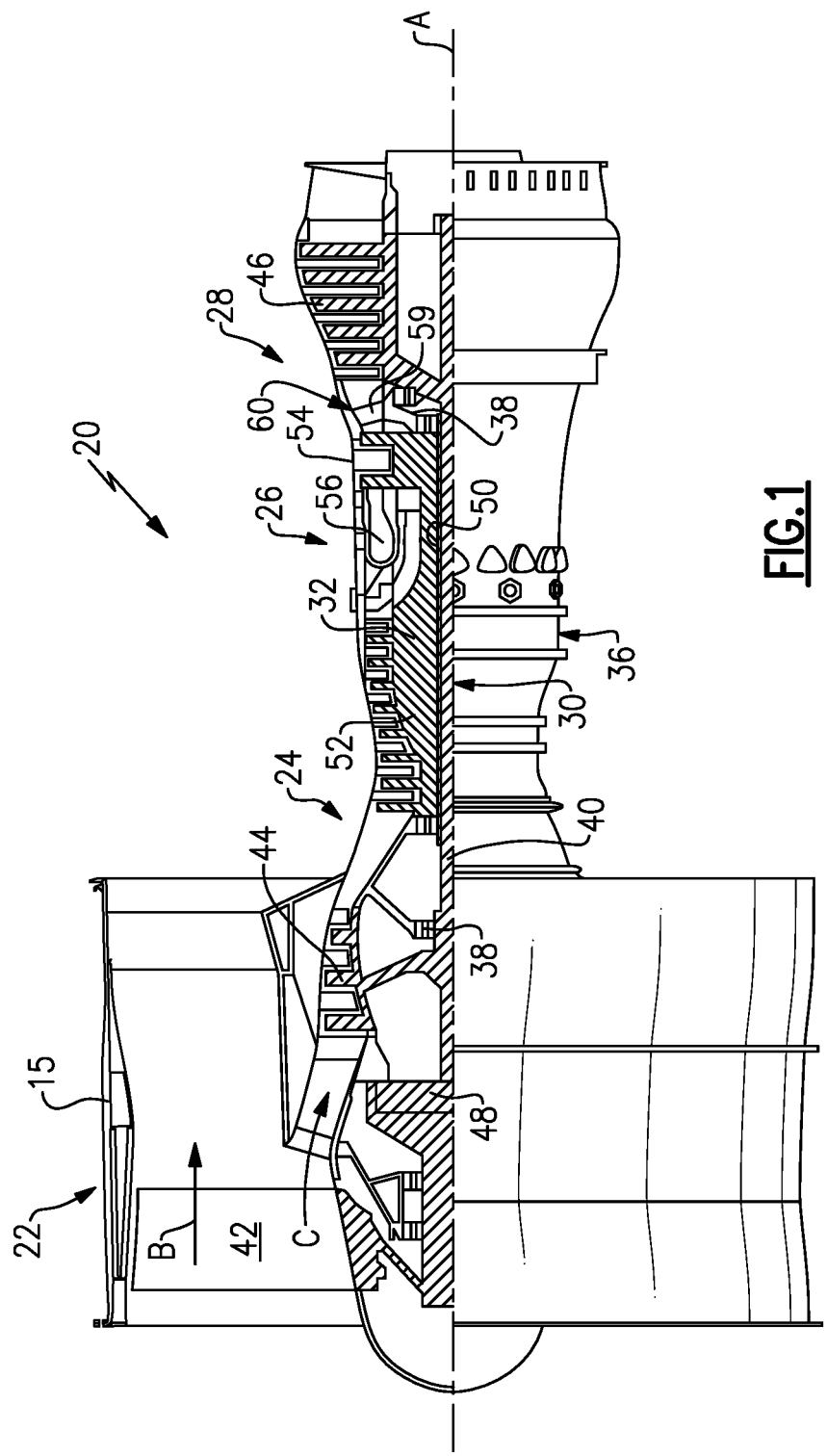
FIG. 1 schematically shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
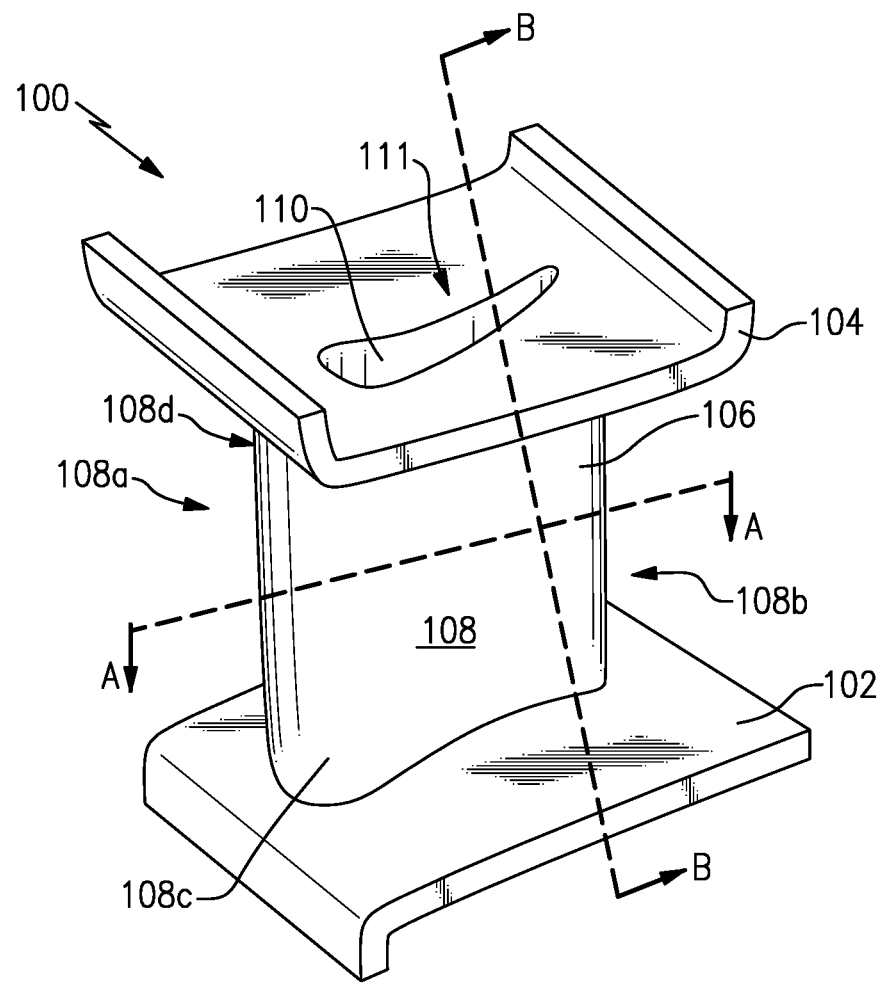
FIG. 2 schematically shows an airfoil assembly for the gas turbine engine of FIG. 1.

FIG. 2 schematically shows an airfoil vane 100 from the turbine section 28 of the engine 20. A plurality of airfoil vanes 100 are situated in a circumferential row about the engine central axis A. The airfoil vane 100 includes a first or inner platform 102, a second or outer platform 104, and an airfoil section 106 that spans between the inner and outer platforms 102/104. FIG. 3 shows a cross-sectional view of the airfoil section 106 along the section line A-A in FIG. 2. The airfoil section 106 includes an airfoil outer wall 108 that delimits the profile of the airfoil section 106. The outer wall 108 defines a leading edge 108a, a trailing edge 108b, and first and second sides 108c/108d that join the leading and trailing edges 108a/108b. In this example, the first side 108c is a pressure side and the second side 108d is a suction side. The outer wall 108 circumscribes an internal cavity 110.

In one example, the airfoil vane 100 is formed of a ceramic material, such as a ceramic matrix composite (CMC) material. For example, the CMC includes a ceramic matrix and ceramic fibers disposed in the ceramic matrix. The ceramic matrix may be, but is not limited to, silicon carbide (SiC) and the ceramic fibers may be, but are not limited to, silicon carbide (SiC) fibers. The CMC is comprised of fiber plies that are arranged in a stacked configuration and formed to the desired geometry of the airfoil vane 100. For instance, the fiber plies may be layers or tapes that are laid-up one on top of the other to form the stacked configuration. The fiber plies may be woven or unidirectional, for example. At least a portion of the fiber plies are continuous through the platforms 102/104 and the airfoil section 106. In this regard, the airfoil vane 100 is a continuous body in that the fiber plies are uninterrupted through the platforms 102/104 and the airfoil section 106. The airfoil vane 100 may also be a monolithic ceramic material, such as a silicon-containing ceramic. Examples of such ceramics include silicon nitride and silicon carbide.

In another example, the airfoil vane 100 is formed of a metallic material.

In this disclosure, the airfoil vane 100 includes an insert 200 which will be discussed in more detail below. The insert 200 can be a spar, which provides structural support for the airfoil vane 100. In another example, the insert 200 is a baffle. In yet another example, the insert 200 is configured to act as both a spar and a baffle.

Cooling air, such as bleed air from the compressor section 24 (FIG. 1), is provided to the internal cavity 110 of the airfoil vane 100. The cooling air can be fed to the internal cavity 110 via the opening 111 in the outer platform 104, shown in FIG. 2. In other examples, the cooling air can be fed to the internal cavity 110 via an opening 111 in the inner platform 102. In another example, the cooling air can be fed into the internal cavity 10 via openings 111 in both the inner platform 102 and outer platform 104. In the embodiment disclosed herein, the cooling air generally flows aftward, e.g., towards the trailing edge 108b. However some of the cooling air may swirl and change directions so that it flows back towards the leading edge 108a or may stagnate altogether. This decreases the thermal convective cooling efficiency of the airfoil vane 100. In general, thermal convective cooling efficiency is maximized when the cooling air travels towards the trailing edge 108b.

Figure 3C:
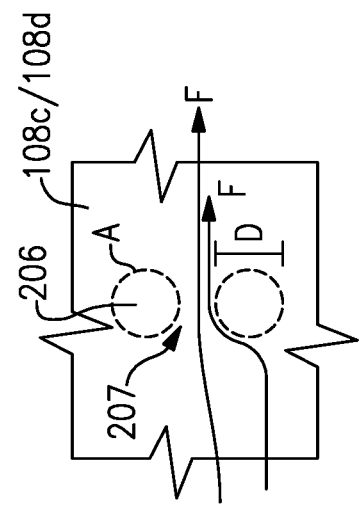
FIGS. 3A-C schematically show a cross-sectional view of an airfoil assembly of FIG. 2 with an insert as described herein.
Figure 3B:
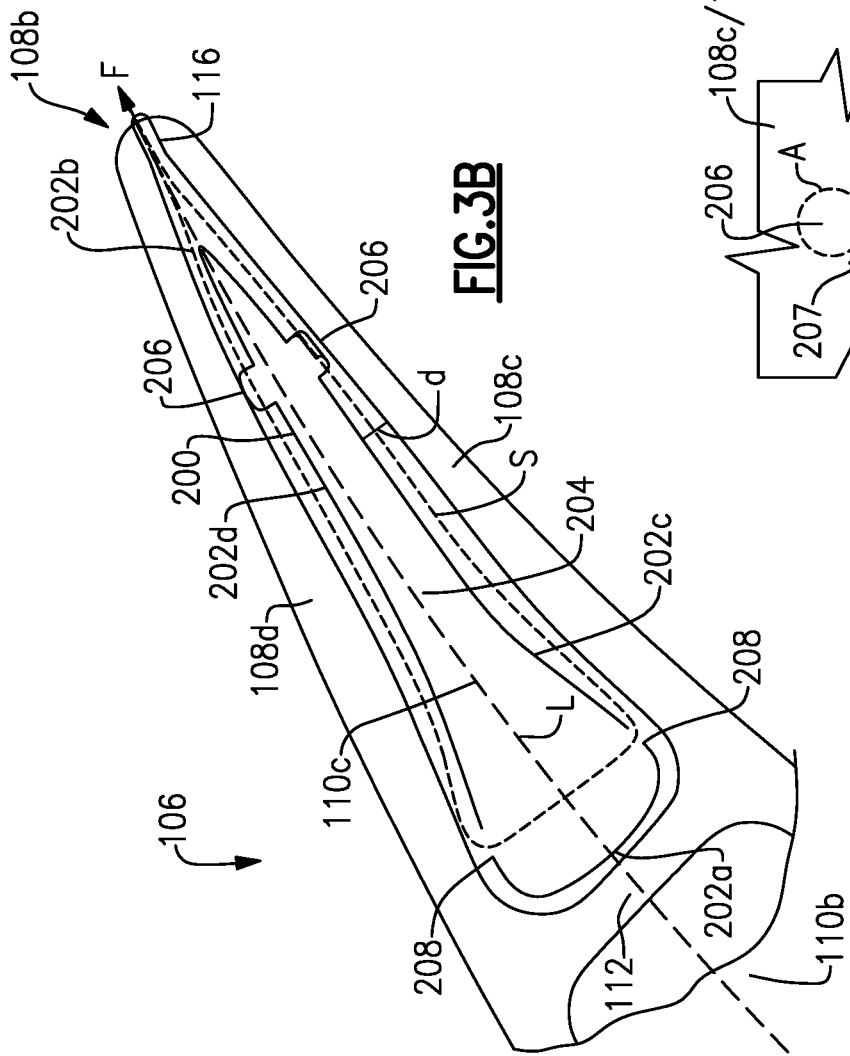
Figure 3A:
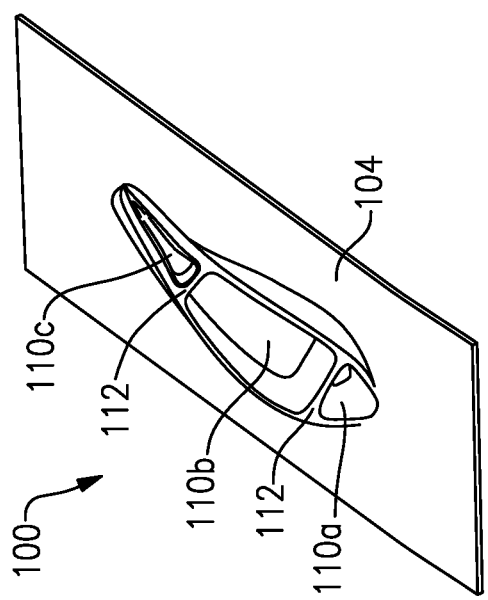
Figure 3D:
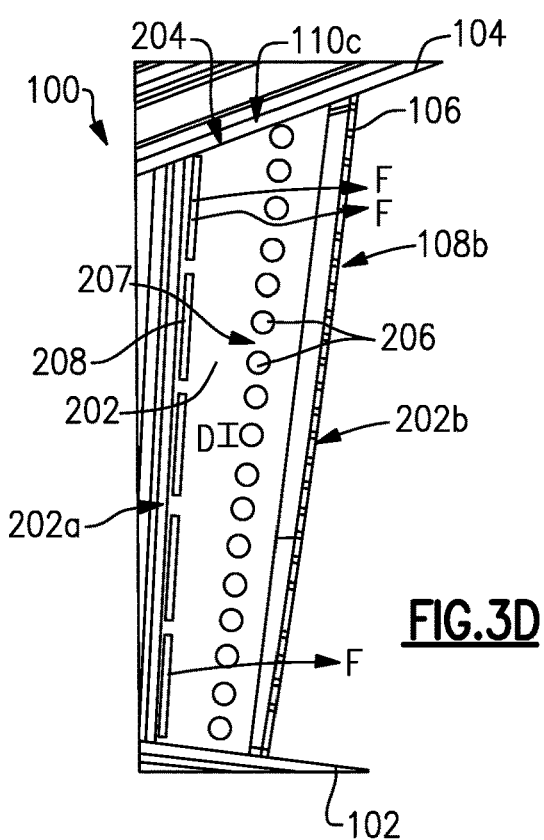
FIG. 3D schematically shows a different cross-sectional view of an airfoil assembly of FIG. 2 with an insert as described herein.

FIGS. 3A-B show a cross-section of the airfoil vane 100 through the section line A-A in FIG. 2. FIG. 3C shows a detail view of the internal surfaces of sides 108c/108d of the airfoil outer wall. FIG. 3D shows a cross-section of the airfoil vane 100 through the section line B-B in FIG. 2. In this example, the internal cavity 110 is divided into three sections 110a, 110b, 110c by dividers 112. Section 110a is a leading edge section, section 110b is a central section, and section 110c is a trailing edge section. However, other examples may have more or less sections/dividers.

FIGS. 3B-C show a detail view of the section closest to the trailing edge 108b, which in this example is trailing edge section 110c. An insert 200 is located in the trailing edge section 110c. The insert 200 has a wall surface 202 that generally trends with the shape of the internal surface of sides 108c/108d of the airfoil outer wall 108 in the trailing edge section 110c. The insert 200 is spaced away or offset from the airfoil outer wall 108 by a distance d (FIG. 3B). The relative offset of the insert 200 with respect to the airfoil outer wall 108, which forms the gap or space, S, shown in FIG. 3B (and discussed in detail below), may vary both radially and axially depending on local internal convective heat transfer, cooling air heat pickup, and pressure loss requirements necessary to mitigate local differences in external heat flux distributions resulting from aerodynamic loading, surface streamlines and freestream temperatures. The wall surface 202 of insert 200 defines a leading edge 202a, a trailing edge 202b, along with first and second side wall surfaces 202c/202d that join the leading and trailing edges 202a/202b. The wall surface 202 of insert 200 circumscribes an internal cavity 204.

In other examples with different numbers of sections 110a, 110b, 110c or with only a single cavity 110 without any divider 112, the insert 200 has an axial extent that situates its trailing edge 202b near the trailing edge 108b of the airfoil outer wall 108.

The trailing edge 108b of the airfoil outer wall 108 includes a cooling air flow discharge exit 116 though which cooling air F exits the internal cavity 110.

As best shown in FIG. 3B, the insert 200 is spaced apart from the internal surface of sides 108c/108d of the airfoil outer wall 108 by a distance d to define a space S therebetween. In some examples, the distance d is between about 30 and 100 mils (0.762 to 2.54 mm). At least one of the first and second sides 202c/202d includes one or more standoff features 206 that extend from an outer surface of the first and second sides 202c/202d into the space S to contact the internal surface of sides 108c/108d of airfoil outer wall 108 at a contact area A (shown in FIG. 3C). In one example, the standoff features 206 may be stamped or otherwise formed into the insert wall 202 to provide a dimple on the exterior surface of the insert wall 202. In another example, the standoff features 206 are attached to, and project from, an exterior surface of the insert wall 202. Though in this example the standoff features 206 are formed in the insert 200 and extend from the first and second sides 202c/202d towards the airfoil outer wall 108 into the space S, in another example, the standoff features 206 could be formed in the airfoil outer wall 108 to extend from the internal surface of the sides 108c/108d towards the sides 202c/202d of the insert wall surface 202 into the space S.

Between adjacent standoff features 206 are gaps 207. The standoff features 206 cause localized disruptions in the cooling air flow F in the space S as will be discussed in more detail below. Still, the bulk of the cooling air flow F travels in a generally aftward direction within the space S. In some examples, the localized disruption can include causing the cooling air F that encounters the standoff feature 206 to change direction, and/or turbulates the cooling air F. In general, this localized disruption of the cooling air F increases the local vorticity of the cooling flow F which may induce additional local internal convection and/or local flow separation immediately downstream of the standoff feature(s) 206. As will be discussed in detail below, the position, shape, orientation, and quantity of the standoff features 206 may vary depending on the criticality of maintaining a specific offset distance, d, to ensure local convective heat transfer and pressure losses are optimally managed to maximize both thermal cooling performance and durability life metrics of the airfoil vane 100. The standoff features 206 maintain the space S in order to provide the desired internal cooling flow F characteristics and participate in orienting the cooling flor F in a direction that is a predominately in an axial and aft-ward streamwise orientation towards the cooling air flow discharge exit 116 in the trailing edge 108b of the airfoil section 106.

This is particularly beneficial when the cooling air is being supplied to the airfoil vane 100 in a predominately radial direction through the opening 111 in the platform 102 and/or through the opening 111 in the platform 104 into the internal cavity 110. In this example, the cooling air supplied through the opening 111 located in platform 102 and/or platform 104 is transported in a predominately radial direction through internal cavity 110. The standoff features 206, located along insert wall surface 202, provide a means to redirect and redistribute the radially oriented cooling air flow in cavity 110, to cooling air flow direction that is predominately in an axial streamwise orientation towards the airfoil trailing edge discharge exit 116 in the trailing edge 108b of the airfoil section 106, which improves cooling efficiency for the airfoil vane 100. The placement of the standoff feature 206 allows for improved cooling air F fill characteristics of the upstream space, S, formed between the insert wall surface 202 and the airfoil outer wall 108. Furthermore, localized disruption of the cooling air F (discussed above) generally improves heat transfer between the cooling air F and airfoil outer wall 108.

The axial and radial distribution of standoff features 206 may vary in size, pitch, shape, orientation, quantity, and spacing to optimize the heat transfer, pressure loss, and cooling air flow distribution and flow rate in order to tailor the convective thermal cooling effectiveness in a manner to better control and manage the thru wall, in-plane, and transverse temperature gradients and absolute operating temperatures of the exterior ceramic airfoil walls 108 during engine operation, as discussed in more detail below.

Referring to FIG. 3D, in this example, the standoff features 206 are arranged in a radial column along one or both of the sides 202c/202d of the insert 200. However, it should be understood that other standoff feature 206 arrangements are also contemplated. For example, while only one column of standoff features 206 are depicted in the Figures, multiple columns of standoff features 206 extending axially can also be used, either in line or staggered. Furthermore, the standoff features 206 in the example of FIGS. 3B-D have a cross-section that is generally round, meaning the contact area A is generally round. However, other shapes are contemplated, including but not limited to elliptical, oblong, teardrop, slots, curvilinear, of varying size, radial, and axial spacing. In addition to serving as support for insert wall surface 202, the standoff features 206 may also serve to improve cooling air flow convective cooling characteristics and/or flow distribution within the gap or space S, between the insert 200, and the internal surfaces of airfoil outer wall sides 108c/108d.

Figure 3E:
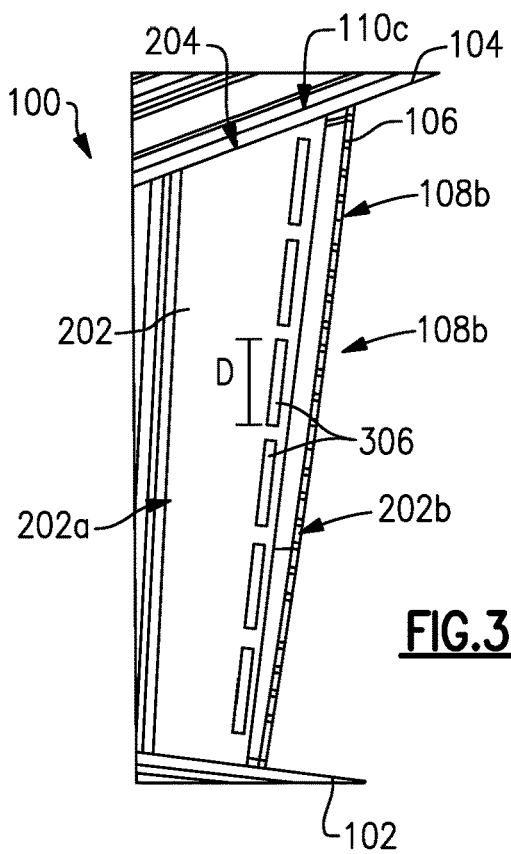
FIG. 3E schematically shows the airfoil assembly of FIG. 2 with another example insert.

In this disclosure, like reference numerals designate like elements where appropriate and reference numerals with the addition of one-hundred or multiples thereof designate modified elements that are understood to incorporate the same features and benefits of the corresponding elements. FIG. 3E shows another example insert 200, which is the same as the insert of FIG. 3D except that it includes standoff features 306 with an oblong shape. The standoff features 306 have a greater maximum dimension D in the radial direction than a maximum dimension in the axial direction of the insert wall surface 202, though other orientations or combinations of orientations are contemplated. In a particular example, oblong standoff features 306 have a ratio of diameter in the radial direction to diameter in the axial direction that is less than about 6.

As shown in FIGS. 3B-C, the standoff features 206 contact the airfoil outer wall 108 at a contact are area A. Cooling air F flows through the space S in an aftward direction. The standoff features 206 block substantially all of the space S in the circumferential direction such that cooling air F cannot pass by the standoff features 206 as it flows aftward, and instead, cooling air F is forced or redirected to the gaps 207 between the standoff features 206. In this way, cooling air F is disrupted as discussed above. Accordingly, the standoff features 206 disrupt the cooling air F to assist in directing substantially all of the cooling flow F towards the discharge 116 in the trailing edge 108b, and improve heat transfer between the cooling air F and airfoil outer wall 108. In some examples, the standoff features 206 can be tailored to particular cooling air F velocities and pressure distributions, as discussed above.

The standoff features 206/306 provide a cumulative percent blockage of the space S defined as the contact area divided by the total area of the insert wall 202, which is generally the area of the respective sides 108c/108d of the airfoil outer wall 108. The cumulative blocked area is the sum of the contact area A (FIG. 3C) of each individual standoff feature 206/306. The blocked area for each individual standoff feature 206/306 can be characterized by its dimension D in the radial direction and its pitch (e.g., the angle at which the standoff feature 206/306 extends out from the insert wall 202). It should be understood that both dimension D and pitch can vary for the standoff features 206. In one example, the standoff features, 206/306, provides a cumulative percent blockage of between about 10 and 70 percent. In a more particular example, the standoff features 206/306 provide a cumulative percent blockage of between about 30 and 70 percent. In a more particular example, the standoff features, 206/306, provide a cumulative percent blockage of between about 50 and 70 percent.

The standoff features 206 each have a height that is measured from the insert wall 202 to the distal end of the standoff feature 206, e.g., to the interior surface of the airfoil outer wall 108. The height of the standoff features 206 thus corresponds to the distance d, and the height/distance d define the area of the space S through which cooling air F can flow. This in turn relates to amount of cooling air that can flow through space S, which relates to the amount of cooling that can be provided by cooling air. For instance, the larger the height of the standoff features 206/the distance d, the larger the area of space S, the more cooling air F can flow through space S and the more cooling the cooling air F can provide to the airfoil outer wall 108. The ability to tailor the standoff 206 height/distance d enables optimization of internal convective heat transfer, pressure loss, and radial cooling flow F distribution within the airfoil section 106 to mitigate non-uniformities in the external heat flux distribution along the outer surface of airfoil outer wall 108.

Figure 3F:
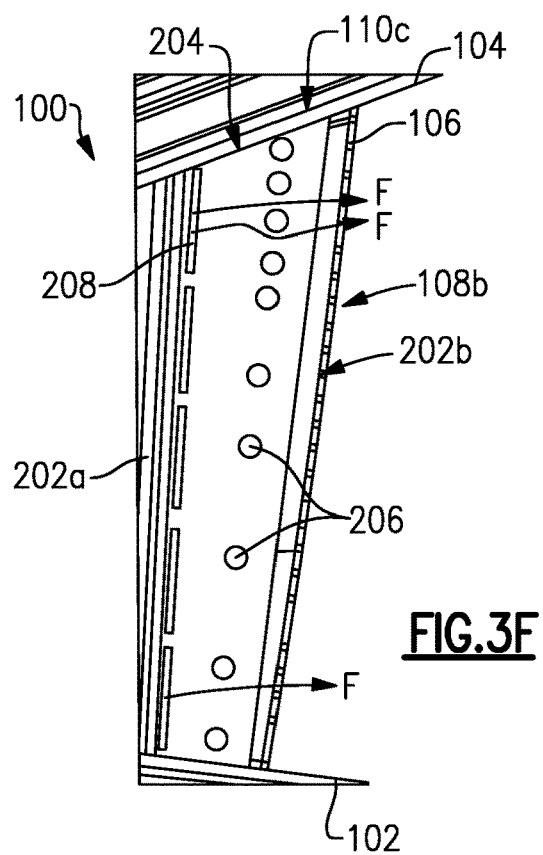
FIG. 3F schematically shows the airfoil assembly of FIG. 2 with another example insert.

As discussed above, in the example of FIGS. 3B-D, the standoff features 206 are arranged in a radial column along the radial extent of the insert wall 202. However, in another example, the radial column may extend less than the entire radial length of the insert wall 202. In another example, multiple columns of standoff features 206 may be provided. In yet another example, shown in FIG. 3F, the standoff features 206 are staggered along the radial column and concentrated near one of the radially inner/radially outer ends of the insert wall 202. In the example of FIG. 3F, the standoff features 206 are concentrated near the radially outer end of the insert wall, e.g., the end of the insert wall adjacent the outer platform 104. However, the opposite is also contemplated. In one example, the standoff features 206 are concentrated near the opposite end of the airfoil vane 100 from which the cooling air F is provided to the airfoil vane 100. For instance, if the cooling air F is provided to the airfoil vane 100 at the inner platform 102, the standoff features 206 are concentrated near the outer platform 104.

In the example of FIGS. 3A-F, the insert wall 202 includes one or more slots 208 near the leading edge 202a of the insert 200. Cooling air F is provided to the internal cavity 110 of the airfoil section 106 and to the internal cavity 204 of the insert 200 as discussed above. The cooling air then exits the internal cavity 204 into the space S via the slots 208. In the example of FIGS. 3A-F, the slots 208 include a radial column of radially-oriented slots, though other orientations/arrangements are contemplated.

Figure 4:
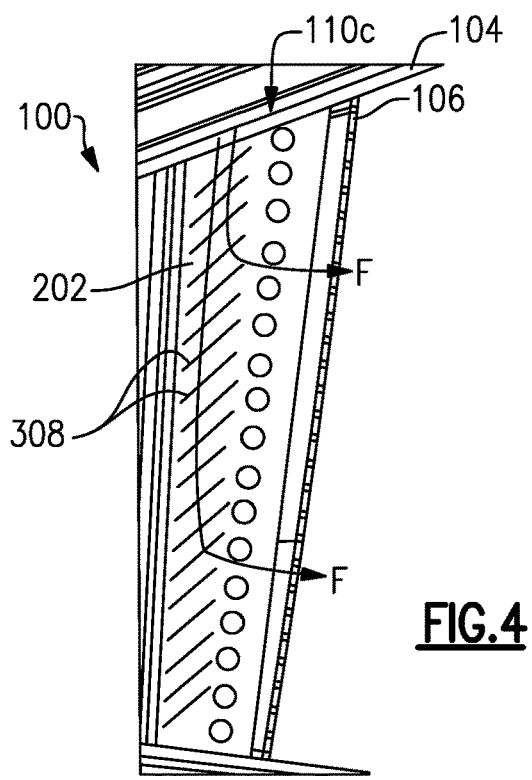
FIG. 4 schematically shows another example airfoil assembly with an insert.

FIG. 4 shows another example insert 200, which is the same as the insert of FIG. 3D except that it does not include radial slots 208. In this example, cooling air F is provided to the space S rather than to the internal cavity 204 of the insert 200. The example insert 200 in FIG. 4 includes ribs 308, which are also known as, "turbulators" or "trip strips," to disrupt cooling air flow F, and enhance the turbulent mixing characteristics by inducing local flow vortices within the cooling air flow F upstream from the standoff features 206, which provides improved convective heat transfer between the cooling air F and the airfoil outer wall 108.

The standoff features 206/306 are arranged at an axial location of the insert 200 that is generally near the discharge 116 in the trailing edge 108b of the airfoil outer wall 108. As shown in FIG. 3B, the insert 200 has an axial extent defined along a chamber line L of the airfoil section 106. In one example, insert 200 has a trailing half and a leading half defined along its axial extent, and the standoff features 206/306 are arranged in the trailing half of the insert 200. In a more particular example, the insert 200 has four quarters defined along its axial extent, and the standoff features 206/306 are defined in the quarter that includes the trailing edge 202b.

The insert 200 can be inserted into a seated positon in the airfoil section 106 from an opening 111 in the platform 102/104, shown in FIG. 2. In the example of FIG. 2, the opening 111 is in the outer platform 104, but in another example, the opening can be in the inner platform 102. Once seated, the insert 200 is then secured in place, such as to the airfoil vane 100 or another adjacent structure in the engine 20. Such an installation of the insert 200 into the airfoil section 106 may be conducted as an initial assembly of the airfoil 100 or, alternatively, as part of a repair or replacement process. For example, the insert 200 can be bolted, clamped, or otherwise joined to either of the airfoil section 106, the adjacent structures in the engine 20, or both.

Although the different examples are illustrated as having specific components, the examples of this disclosure are not limited to those particular combinations. It is possible to use some of the components or features from any of the embodiments in combination with features or components from any of the other embodiments.

It is also recognized that although only a single row of standoff features 206 is illustrated, that one or more rows, and/or an array of standoff features 206 may be incorporated comprising of both uniform and/or non-uniform distributions in order to obtain the necessary flow and heat transfer characteristics required to achieve optimal thermal cooling performance and part durability life.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An airfoil vane comprising:
an airfoil section including an outer wall that defines an internal cavity; and
an insert situated in the internal cavity, a space defined between the insert and the airfoil outer wall, the insert including an insert wall, and plurality of standoff features extending towards the airfoil outer wall from an outer surface of the insert wall into the space and contacting the airfoil outer wall at a contact area, whereby the standoff features are configured to block airflow in the space at the contact area and redirect the airflow to gaps between the standoff features.

2. The airfoil vane of claim 1, wherein the plurality of standoff features includes a radial column of standoff features.

3. The airfoil vane of claim 2, wherein the radial column of standoff features extends an entire radial extent of the insert.

4. The airfoil vane of claim 2, wherein the radial column of standoff features extends less than an entire radial extent of the insert.

5. The airfoil vane of claim 1, wherein the airfoil section includes at least one divider dividing the internal cavity into two or more sections.

6. The airfoil vane of claim 5, wherein the insert is situated in a section or the two or more sections that is nearest a trailing edge of the airfoil section.

7. The airfoil vane of claim 1, wherein the plurality of standoff features are stamped into the insert wall.

8. The airfoil vane of claim 7, wherein at least some of the plurality of standoff features have a cross-sectional shape that is generally round.

9. The airfoil vane of claim 1, wherein the plurality of standoff features are attached to the outer surface of the insert wall.

10. The airfoil vane of claim 1, wherein at least some of the plurality of standoff features are oblong, and have a dimension in the radial direction that is greater than a dimension in the axial direction.

11. The airfoil vane of claim 1, wherein the plurality of standoff features are arranged closer to a trailing edge of the insert than a leading edge of the insert.

12. The airfoil vane of claim 1, further comprising at least one slot extending through the insert downstream from the plurality of standoff features, the at least one slot configured to communicate cooling air from an internal cavity of the insert to the space.

13. The airfoil vane of claim 1, wherein the plurality of standoff features provide a cumulative blocked area that is between about 10 and 70 percent.

14. An gas turbine engine, comprising:
a compressor section;
a combustor in fluid communication with the compressor section;
a turbine section in fluid communication with the combustor;
an airfoil vane in at least one of the compressor section and the turbine section, the airfoil vane including an outer platform and an inner platform, with an airfoil section therebetween, the airfoil section having an outer wall that defines an internal cavity; and
an insert situated in the internal cavity, a space defined between the insert and the airfoil outer wall, the space configured to receive cooling air, wherein the insert includes an insert wall with a plurality of standoff features extending towards the airfoil outer wall from an outer surface of the insert wall into the space, and contacting the airfoil outer wall at a contact area, whereby the plurality of standoff features are configured to block flow of the cooling air in the space at the contact area.

15. The gas turbine engine of claim 14, further comprising at least one slot extending through the insert downstream from the plurality of standoff features, the at least one slot configured to communicate the cooling air from an internal cavity of the insert to the space.

16. The gas turbine engine of claim 14, wherein the cooling air flows between adjacent ones of the plurality of standoff features.

17. The gas turbine engine of claim 14, wherein the plurality of standoff features are configured to disrupt cooling air flow in the space.

18. The gas turbine engine of claim 14, wherein the cooling air is bleed air from the compressor section.

19. A method of assembling a ceramic matrix composite airfoil vane, comprising:
   inserting an insert into a central cavity of a ceramic matrix composite airfoil such that there is a space defined between the insert and an airfoil outer wall, the insert including an insert wall, and plurality of standoff features extending from the insert wall into the space, and contacting the airfoil outer wall at a contact area, whereby the standoff features are configured to block flow of cooling air in the space at the contact area but allow cooling air to flow between adjacent ones of the standoff features.

20. The method of claim 19, wherein the plurality of standoff features includes a radial column of standoff features.

* * * * *